United States Patent
Yip et al.

(10) Patent No.: US 7,003,705 B1
(45) Date of Patent: *Feb. 21, 2006

(54) ETHERNET AUTOMATIC PROTECTION SWITCHING

(75) Inventors: Michael Yip, Sunnyvale, CA (US); Sunil P. Shah, San Jose, CA (US); Michelle M. Ragonese, Burlingame, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/871,297

(22) Filed: Jun. 17, 2004

Related U.S. Application Data

(63) Continuation of application No. 09/999,796, filed on Oct. 31, 2001, now Pat. No. 6,766,482.

(51) Int. Cl.
*G01R 31/28* (2006.01)
(52) U.S. Cl. .................. 714/717; 370/216; 370/222
(58) Field of Classification Search .......... 370/403, 370/228, 395.53, 466, 254, 422, 216, 440, 370/222; 395/5; 709/230; 714/717
See application file for complete search history.

(56) References Cited

U.S. PATENT DOCUMENTS

| | | | |
|---|---|---|---|
| 5,003,531 A | 3/1991 | Farinholt et al. | |
| 5,159,595 A | 10/1992 | Flanagan et al. | |
| 5,781,715 A | 7/1998 | Sheu | |
| 5,802,056 A * | 9/1998 | Ferguson et al. | 370/403 |
| 5,923,643 A | 7/1999 | Higgins et al. | |
| 5,958,064 A | 9/1999 | Judd et al. | |
| 6,088,141 A * | 7/2000 | Merli et al. | 398/5 |
| 6,163,527 A * | 12/2000 | Ester et al. | 370/228 |
| 6,233,619 B1 * | 5/2001 | Narisi et al. | 709/230 |
| 6,414,958 B1 * | 7/2002 | Specht | 370/395.53 |
| 6,430,150 B1 | 8/2002 | Azuma et al. | |
| 6,445,715 B1 * | 9/2002 | Annaamalai et al. | 370/466 |
| 6,510,141 B1 * | 1/2003 | Ramfelt et al. | 370/254 |
| 6,600,719 B1 | 7/2003 | Chaudhuri | |
| 6,658,015 B1 * | 12/2003 | Merchant et al. | 370/422 |
| 6,678,241 B1 * | 1/2004 | Gai et al. | 370/216 |
| 6,834,056 B1 * | 12/2004 | Hayes | 370/440 |

* cited by examiner

*Primary Examiner*—David Ton
(74) *Attorney, Agent, or Firm*—Blakely, Sokoloff, Taylor & Zafman LLP

(57) ABSTRACT

A method and apparatus is provided for automatic protection switching in a ring network by creating a protection domain having a control vlan and protected data vlans and designating a master node and transit nodes connected by a primary port and a secondary port. The master node blocks the secondary port for data vlan traffic until it detects a fault either by notice from a transit node or by polling. When a fault is detected, the master node unblocks the secondary port for data vlan traffic. When the fault is restored, the transit node temporarily blocks the restored port to data vlan traffic thereby preventing a loop. Each time the secondary port is blocked and unblocked, the forwarding databases on all the nodes are flushed.

4 Claims, 8 Drawing Sheets

ETHERNET AUTOMATIC PROTECTION SWITCHING

The present patent application is a Continuation of application Ser. No. 09/999,796, filed Oct. 31, 2001 now U.S. Pat. No. 6,766,482.

TECHNICAL FIELD

The present invention relates to the field of network communications. In particular, the present invention relates to a system of automatic protection switching in a ring based bridged network.

BACKGROUND

The amount of data traffic being sent over metropolitan area networks (MANs) is increasing at an exponential rate. This is due in part to the increasingly ubiquitous use of the Internet by consumers and businesses, as well as the increasingly bandwidth-intensive nature of the Internet applications that are being deployed. Today's installed MAN infrastructure is based on the Synchronous Optical NETwork (SONET), a layer-1 technology that was developed in the mid-1980s for the public telephone network and adopted by the American National Standards Institute (ANSI) as a standard for fiber optic networks. "Layer-1" and "layer-2" as used in this document refer to the OSI (Open Systems Interconnection) Reference Model. SONET has a self-healing capability in which one piece of optical fiber handles all data traffic and a second piece of optical fiber remains on standby. Should the working section fail, SONET has an automatic capability to detect the failure and transfer control to the standby section. SONET is a multiplexing technology, which means that it enforces a rigid time-division multiplexing telecom hierarchy. While this approach works well for voice traffic, it is unnecessarily expensive and inefficient for data traffic.

An alternative to using SONET as the provisioning platform for networking service is to use a bridged, layer-2 network like the Ethernet. Such networks can provide services to areas where fiber optic lines don't extend and generally provide better data capacity at a lower cost. A problem with bus and ring networks like the Ethernet is the possibility of a single point of failure causing the system to breakdown. A common solution is to design the network with redundant segments and loops so that there is more than one route to each node in a SONET-like approach. Redundancy and loops can, however, present another problem in which a broadcast packet or an unknown unicast packet results in a broadcast storm where each node receives and rebroadcasts the packet causing potentially severe network congestion.

One way known in the industry of preventing broadcast storms and other unwanted side effects of looping is to use the Spanning Tree Protocol (STP) which has been standardized in the 802.1D specification by the Institute of Electrical and Electronic Engineers (IEEE Std. 802.1D-1998, IEEE Standard for Information technology—Telecommunications and information exchange between systems—Local and metropolitan area networks—Common specifications). With STP, the bridges in the network dynamically calculate an optimum subset of the topology that is loop-free and allows a path to each node. Alternate paths are blocked and unblocked as necessary to keep the routes of communication open when a fault occurs. A significant problem with STP is that when a link breaks, it may take thirty or more seconds for a path around the problem to be calculated and traffic successfully rerouted. This level of performance is too slow for use in today's local area networks (LANs) and metropolitan area networks (MANs), for example, where the customer expects seamless connections, undetectable fault correction, and data security.

SUMMARY OF THE INVENTION

A method is provided in which an Ethernet automatic protection switching (EAPS) system prevents loops in a layer-2 network having a ring topology. The EAPS system comprises an EAPS domain having a control vlan and at least one protected data vlan. The EAPS domain is associated with a master node linked to at least one transit node in a ring network.

According to one aspect of the invention, the EAPS system operates in conjunction with the master node to detect a network failure by means of control messages sent between the nodes using the control vlan. During normal operation, the master node blocks the protected data vlan traffic from traversing its secondary port. During a network failure, the master node reroutes the protected data vlan traffic through its secondary port.

According to one aspect of the invention, when the network is restored, the EAPS system operates in conjunction with the affected transit node to prevent looping by blocking the protected data vlan traffic from traversing its restored ring port until notified by the master node that the normal operation has resumed.

According to one aspect of the invention, the master node and the transit nodes forward the EAPS control messages prior to copying them to the nodes' CPU where among other things they are logged for use in troubleshooting.

According to one aspect of the invention, the EAPS system may be implemented on one or more network devices, such as a switch or other packet-forwarding device, a network server computer, and an end station or host computer.

In accordance with these and other aspects of the present invention, apparatus are provided for carrying out the above and other methods.

BRIEF DESCRIPTION OF THE DRAWINGS

The present invention is illustrated by way of example, and not necessarily by way of limitation, in the figures of the accompanying drawings in which like reference numerals refer to similar elements, and in which.

DETAILED DESCRIPTION OF THE INVENTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Parts of the description will be presented in terms of operations performed by a computer system, using terms such as data, state, link, fault, packet, and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, routers, bridges, switches, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentation.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides a method and apparatus for automatic protection switching in a layer-2 ring topology network. Specifically, the method and apparatus use protection domains and virtual local area networks (vlans) to recover from fault quickly and efficiently in a bridged, layer-2 network.

Figure 1:
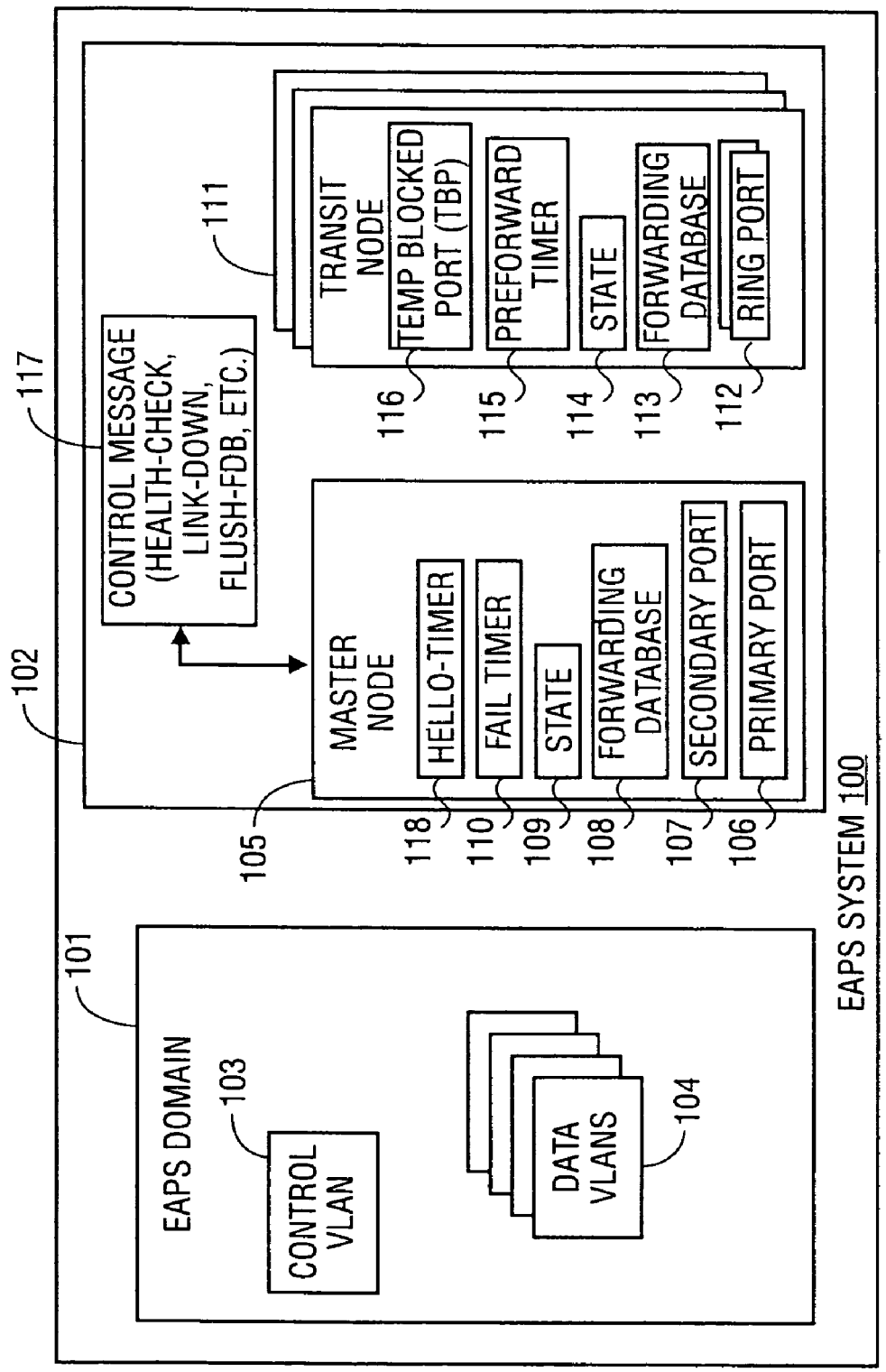
FIG. 1 is a block diagram illustrating an Ethernet Automatic Protection Switching (EAPS) system incorporating the invention in accordance with one embodiment.

FIG. 1 is a block diagram illustrating an Ethernet Automatic Protection Switching (EAPS) system incorporating the invention in accordance with one embodiment. The EAPS system 100 consists of one or more EAPS domains 101. A control vlan 103 is created for each EAPS domain 101 for the purpose of sending and receiving EAPS system control messages 117. The EAPS domain 101 is created to protect a group of one or more data carrying vlans 104.

The EAPS system 100 operates on a ring network 102. One node on the ring network 102 is designated as the master node 105. The two ring ports on the master node 105 are designated as primary port 106 and secondary port 107. All other nodes on the ring network 102 are transit nodes 111 and each has its respective ring ports 112. Each master node 105 and transit node 111 has a forwarding database (FDB), 108 and 113 respectively, in which they store information about the network communication paths. The master node 105 has a state register 109 for storing the state of the ring network 102. For the purpose of illustration, the states of the ring network 102 are described either as "failed," meaning there is a fault or break in the ring network 102, or as "complete," meaning that the ring network is unbroken or the ring network has been restored and all nodes are communicating correctly. The transit nodes 111 have a state register 114 in which they store the pre-forwarding state, and a pre-forwarding timer 115. The transit nodes 111 also have a temporarily-blocked-port storage area (TBP) 116 in which they store the identification of the port that is temporarily blocked. Pre-forwarding and TBPs are discussed below.

In one embodiment of the invention, the master node 105 and the transit nodes 111 use control messages 117 to communicate via the control vlan 103. Some examples of control messages 117 in the embodiment are health-check messages, link-down messages, and flush-fdb messages. The transit node 111 recognizes a message sent on the control vlan 103 as a control message 117 because it has a special MAC (media access control) address that corresponds to an entry in the forwarding database 113. The master node and the transit nodes forward the control message 117 prior to copying it to the central processing unit (CPU) of the node where, among other things, it is logged for use in troubleshooting. Forwarding the control message 117 before processing by the CPU facilitates the convergence of the ring network 102 after a fault in substantially less time than can be achieved with prior art methods. In one embodiment, the convergence of the ring network 102 using the EAPS system 100 occurs in substantially less than one second.

The master node 105 has a hello-timer 118, which is the clock for sending the health-check control messages 117. Once the hello-timer 118 is started, it prompts the master node 105 to send a health-check message 117 on the control vlan 103 at regular intervals, for example every one second. The health-check message 117 is forwarded around the ring network 102 and returns to the master node 105 nearly instantaneously. When the master node 105 sends the health-check message 117, it sets the fail-timer 110. Should the fail-timer 110 expire before the health-check message is returned to the master node 105, the master node 105 determines that there is a fault in the ring network 102. The health-check messages 117 are sent even during a fault. When the fault is restored, the master node 105 knows immediately because the return of the health-check message 117 is resumed.

Figure 2:
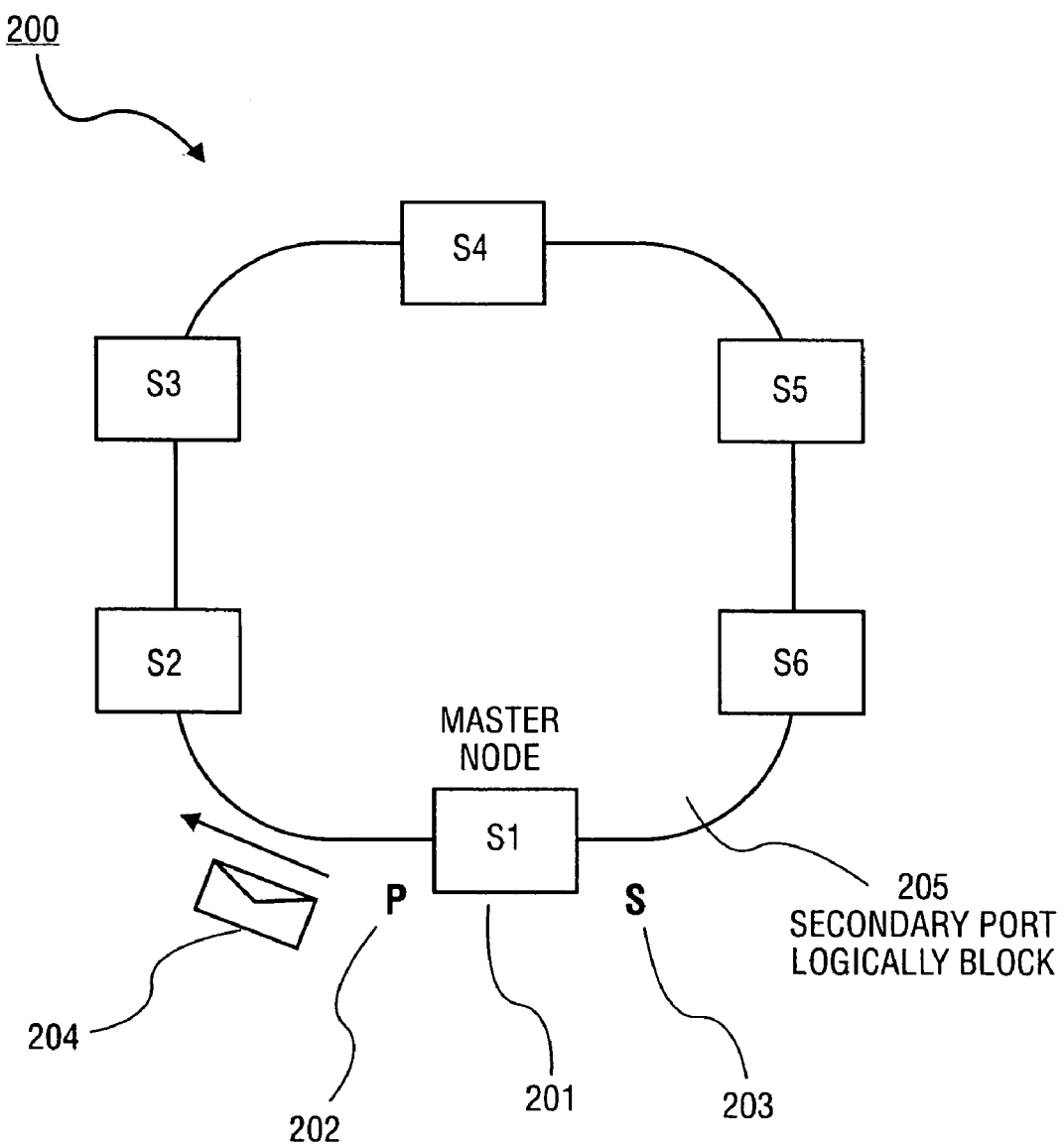
FIG. 2 is an illustration of a ring network incorporating the invention, and in which certain aspects of the illustrated invention may be practiced.

FIG. 2 is an illustration of a ring network 200 incorporating the invention, and in which certain aspects of the invention may be practiced. In the illustration, the ring network 200 is complete, i.e., all nodes are communicating on the primary port 202. In the illustrated embodiment, S1, 201, is the master node. During normal operation, the master node 201 blocks 205 protected data vlan traffic from traversing the secondary port 203 to prevent a loop. The control vlan 103 is not blocked on the secondary port; only the data vlans 104 are blocked. The ports are blocked and unblocked using technology that is known in the art and therefore will not be further discussed except as it pertains to the invention.

Figure 3:
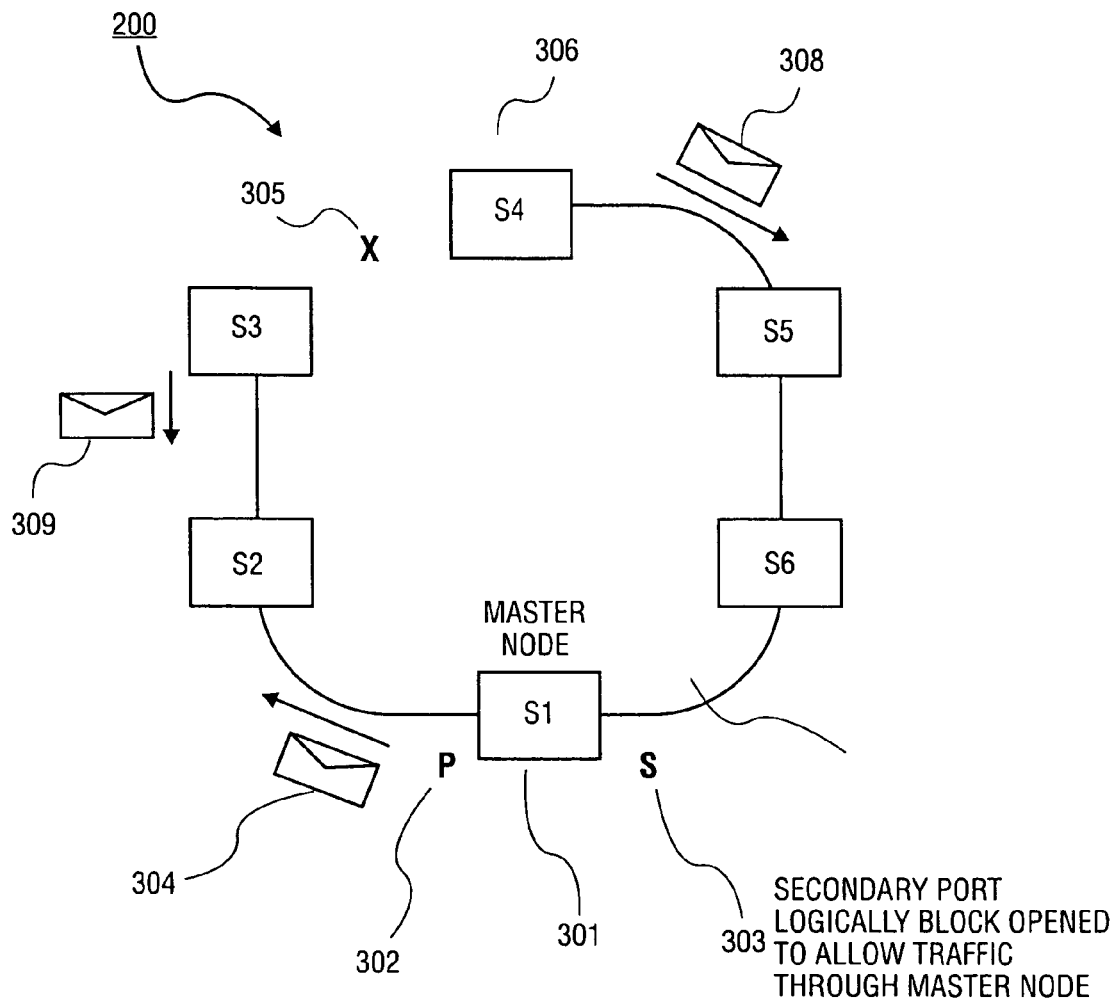
FIG. 3 illustrates fault detection in the ring network of FIG. 2 and in which certain aspects of the illustrated invention may be practiced.

FIG. 3 illustrates fault detection in the ring network 200 of FIG. 2. When the master node 301 detects a break in the ring 305, it unblocks the secondary port 303 and allows data traffic to be transmitted and received through the secondary port 303. The master node 301 detects a fault in the ring network 200 using polling or trapping.

In polling, the master node 201/301 periodically sends a health-check control message 204/304 via the control vlan 103 on the primary port 202/302. The health-check control message 204/304 is one of the control messages 117 exchanged between the master node 105 and the transit nodes 111. When the ring network 200 is complete, as illustrated in FIG. 2, the health-check control message 204 will be returned to the master node 201 on its secondary port 203 before the fail-timer 110 expires, and the master node 201 will know that the ring network 200 is complete. As illustrated in FIG. 3, when there is a break 305 in the ring network 200, the health-check control message 304 will not be returned to the master node 301 before the fail-timer 110 expires.

In trapping, as illustrated in one embodiment in FIG. 3, the master node S1, 301 receives a link-down control message 308 from a transit node 306. The link-down control message 308 is another of the control messages 117 exchanged between the master node 105 and the transit nodes 111. When the transit node 306 detects a fault (i.e., a break in the ring) on one of its ring ports 112, it immediately sends a link-down control message 308 to the master node 301 via the control vlan on its good port. In the example in FIG. 3, the transit node S3, 307, also sends a link-down control message 309 to the master node 301.

Figure 4:
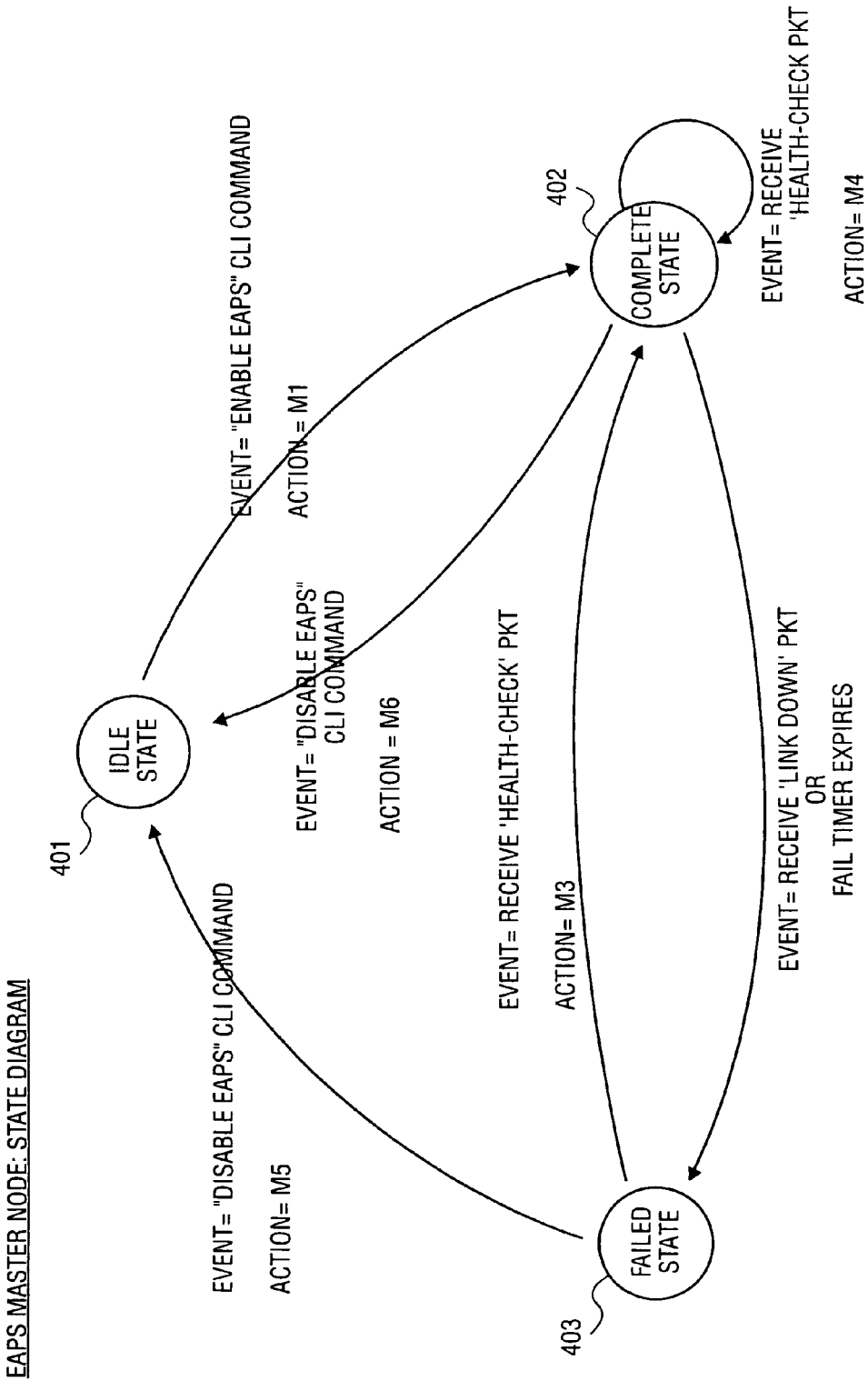
FIG. 4 is a state diagram illustrating operation of the master node in accordance with one embodiment of the present invention.

FIG. 4 is a state diagram illustrating operation of the master node 105 in accordance with one embodiment of the present invention. Refer also to Table 1 for a description of the EAPS master node actions M1–M6. From the idle state 401, the master node receives an enable EAPS command and executes the M1 actions: the master node starts the hello-timer 118, starts the fail-timer 110, blocks the data vlans on the secondary port 107, flushes its FDB 108, and sends a health-check control message 117, to the network on the primary port 106. When the ring network 102 is complete, the health-check control message 117 is returned to the master node 105 on its secondary port 107 and the master node 105 performs the M4 actions: the master node 105 resets its fail-timer 110 and remains in complete state 402. When the health-check control message 117 is not returned to the master node 301/105 before the fail-timer 110 expires or when the master node 301/105 receives a link-down control message 117 from a transit node 306/111, it performs the M2 actions: the master node 301/105 declares a failed state 403, unblocks the blocked data vlans 104 on the secondary port 107, flushes its FDB 108, and sends a flush-fdb control message 117 to all of the transit nodes 111 on the ring via control vlan 103. Flushing the FDB 108/113 forces all of the nodes to relearn the new path to the layer-2 end stations via the reconfigured topology.

The master node 105 continues sending health-check control messages 117 on its primary port 106 even when the state is failed (i.e., the ring is broken). The hello-timer 118 continues to run until the master node 105 receives a disable EAPS command and performs either the M5 actions from the failed state 403 or the M6 actions from the complete state 402. When there is a break in the ring network 102, no health-check control message 117 is returned to the master node 105, the master node's fail-timer 110 expires, and the ring network 102 remains in the failed state 403. When the broken link is restored, the health-check control message 117 is returned to the master node 105 on its secondary port 107. The master node 105 sets the state 109 to complete and performs the M3 actions: the master node 105 blocks the data vlans 104 on the secondary port 107, flushes its FDB 108, sends a ringup-flushfdb control message 117 to the transit nodes 111, and restarts the fail-timer 110.

TABLE 1

EAPS Master Node Actions

| | |
|---|---|
| M1 | —Start Hello-timer<br>—Start Fail-timer<br>—Block Secondary Port<br>—Flush FDB<br>—Send 'Health-check' packet on Primary Port |
| M2 | —Open Secondary Port<br>—Flush FDB<br>—Send 'ringdown-flushfdb' packet to Transit Nodes |
| M3 | —Block Secondary Port<br>—Flush FDB<br>—Send 'ringup-flushfdb' packet to Transit Nodes |
| M4 | —Restart Fail-timer |
| M5 | —Stop Hello-timer<br>—Stop Fail-timer |
| M6 | —Stop Hello-timer<br>—Stop Fail-timer<br>—Open Secondary Port |

From the time the link is restored on the transit node 111 until the time the master node 105 detects the ring network 102 to be complete, there could be a temporary loop in the system. The temporary loop could occur because the master node 105 has not yet blocked the secondary port 107. Consequently, data traffic could be traversing both the secondary port 107 and the transit node port that was just restored.

Figure 5:
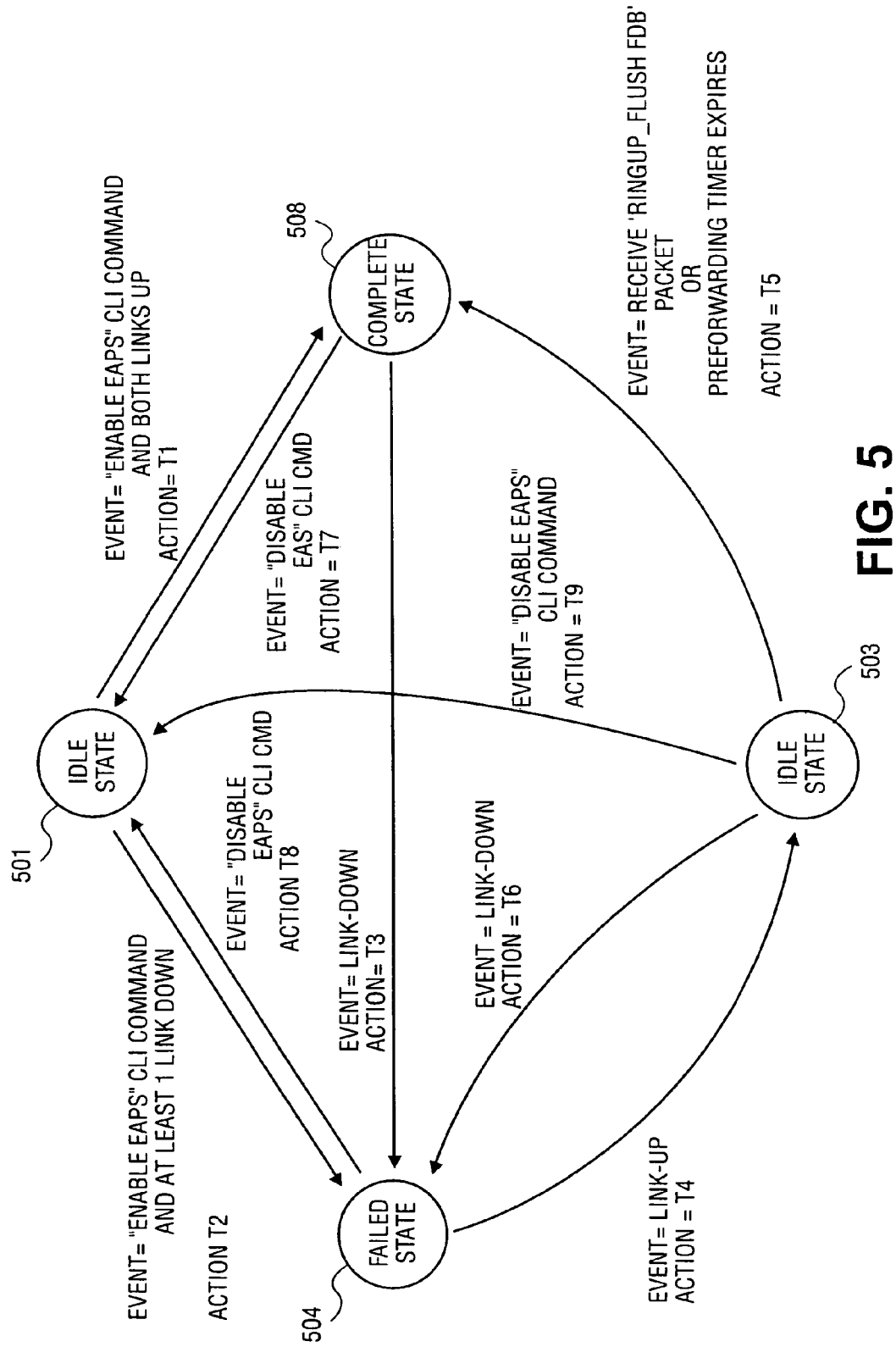
FIG. 5 is a state diagram illustrating operation of a transit node in accordance with one embodiment of the present invention.

FIG. 5 is a state diagram illustrating operation of a transit node 111 in a manner that prevents a temporary loop in accordance with one embodiment of the present invention. Refer also to Table 2 for a description of the EAPS transit node actions T1 –T9. When a transit node 111 is in a link-down state 504 and receives notice that the link is restored, the node takes the T4 actions: the transit node 111 blocks the data vlans 104 on the restored port, starts the pre-forwarding timer 115, stores the identification of the blocked port in the TBP 116, and sets the state 114 to pre-forwarding 503. In the pre-forwarding state 503, when the transit node 111 receives the flush-fdb control message 117 from the master node 105, or when the pre-forwarding timer 115 expires, the transit node 111 performs T5 actions: the transit node 111 stops the pre-forwarding timer 115, and unblocks the data vlans 104 from the port that is identified in the TBP 116.

With further reference to FIG. 5, when a transit node 111 moves from the idle state 501 to a link-down state 504, it performs T2 actions, and when it moves from the idle state to a links-up state 502, it performs T1 actions. In both cases it creates an entry in the FDB 113. When a transit node 111 returns to the idle state 501 from the links-up state it performs T7 actions, from the link-down state it performs T8 actions and from the pre-forwarding state 503 it performs T9 actions. In all three cases, it deletes the entry in the FDB 113. When it moves from the pre-forwarding state 503 to the idle state 501, it also unblocks the data vlans from the port that is identified in the TBP storage area 116 and stops the pre-forwarding timer 115.

TABLE 2

EAPS Transit Node Actions

| | |
|---|---|
| T1 | |
| T2 | —Create FDB entry |
| T3 | —Create FDB entry |
| T4 | —Send 'link-down' message to Master Node |
| T5 | —Temporarily block newly restored port<br>—Start Pre-forwarding Timer |
| T6 | —Stop Pre-forwarding Timer<br>—Open port that was temporarily blocked |
| T7 | —Stop Pre-forwarding Timer |
| T8 | —Stop Pre-forwarding Timer |
| T9 | —Stop Pre-forwarding Timer |
| | —Open port that was temporarily blocked<br>—Stop Pre-forwarding Timer<br>—Delete FDB entry |

Figure 6:
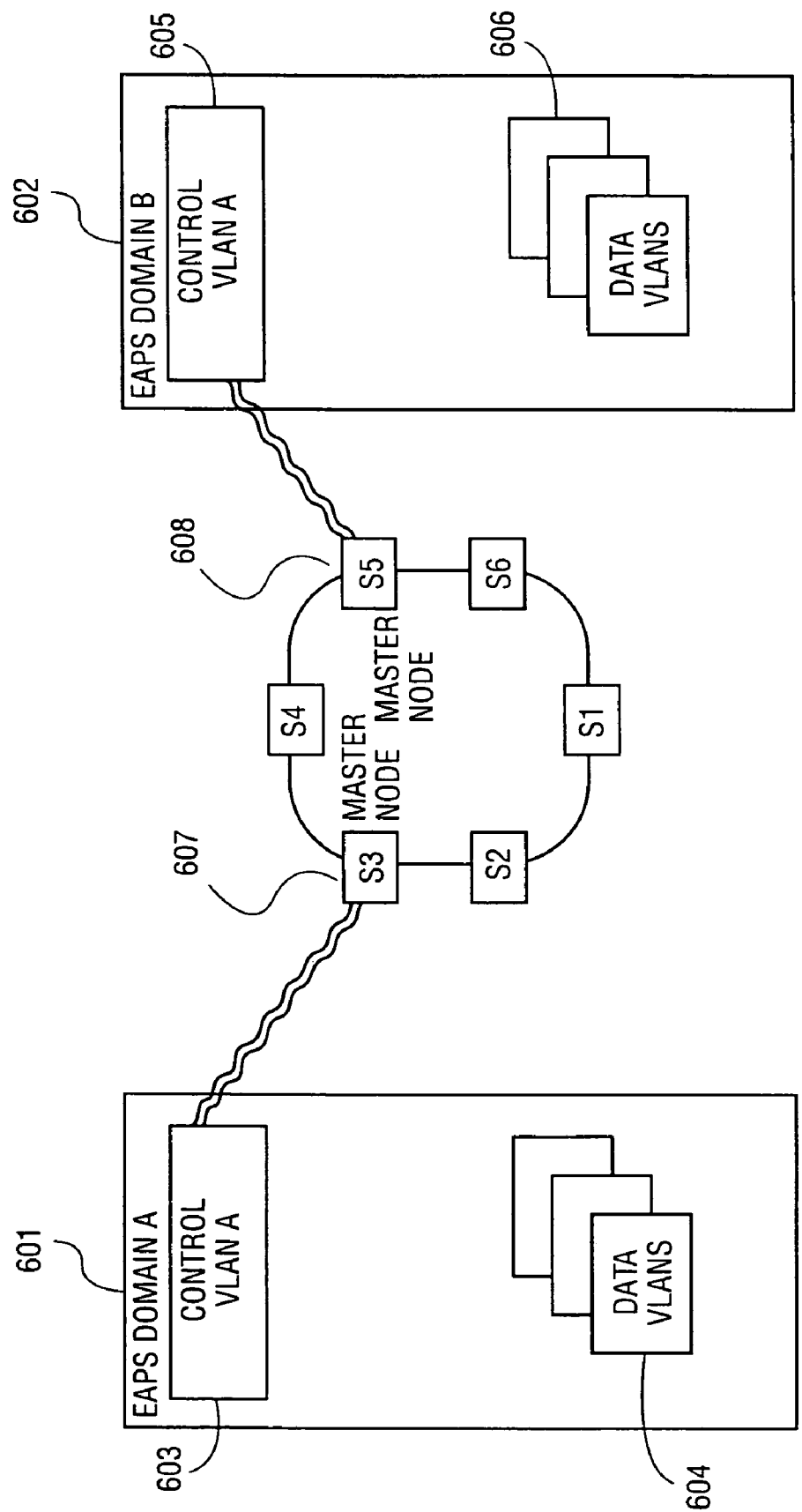
FIG. 6 is an illustration of a network configuration in which multiple EAPS domains are running on one ring in the network, and in which certain aspects of the illustrated invention may be practiced.

FIG. 6 illustrates another embodiment of the invention in which multiple EAPS domains 101 are running on one ring in a network. Multiple EAPS domains on one ring improve network efficiency by enabling spatial reuse of the ring network. Each EAPS domain 601, 602 is responsible for protecting its own group of data vlans 604, 606. Each EAPS domain 601, 602 has a unique control vlan 603, 605 and a master node 607, 608. EAPS domains can have the same master node (not shown) or, as illustrated, different master nodes 607, 608.

Figure 7:
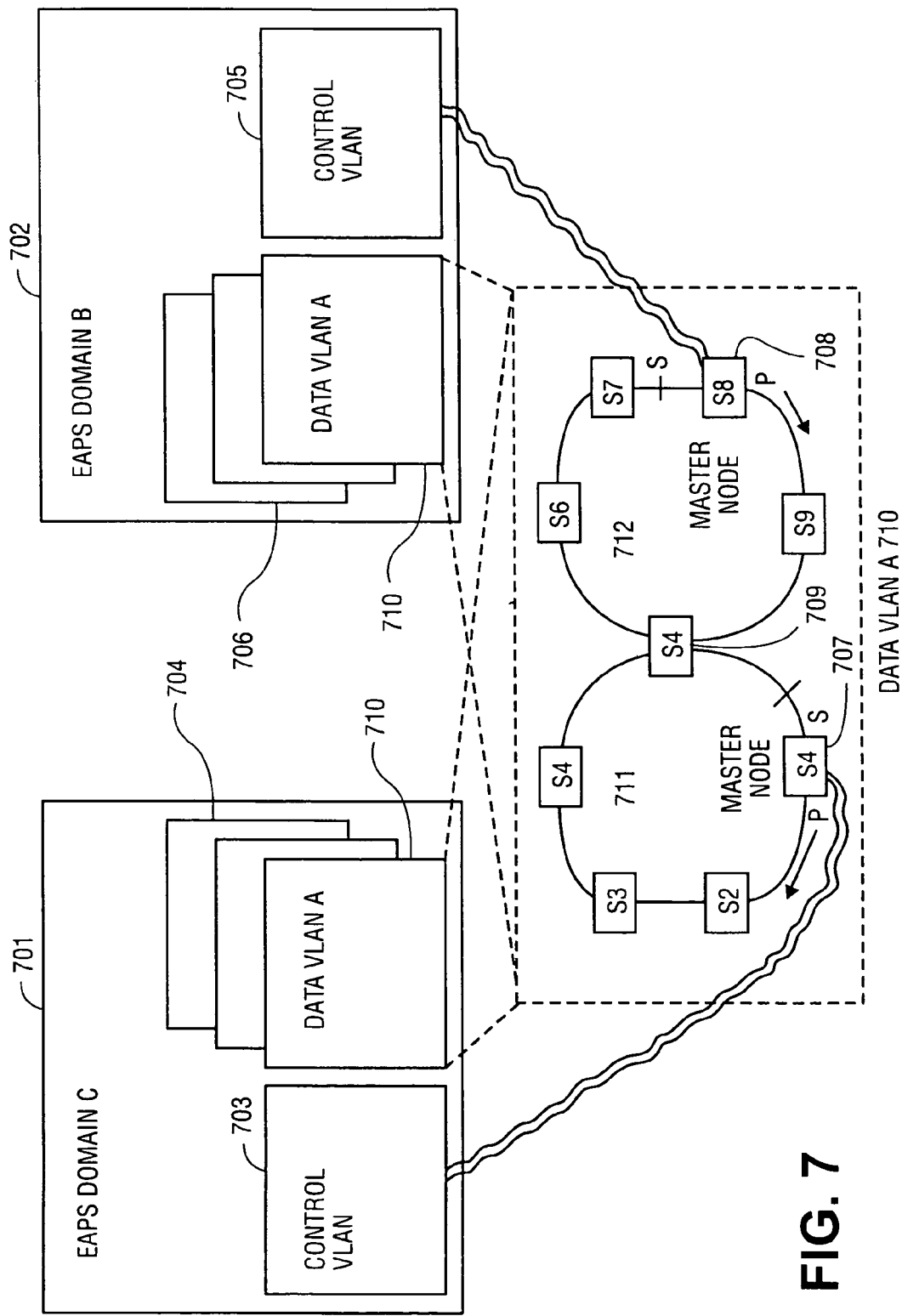
FIG. 7 is an illustration of another network configuration in which a data vlan spans multiple rings interconnected by one node and is included in two EAPS domains, and in which certain aspects of the illustrated invention may be practiced.

FIG. 7 illustrates yet another embodiment of the invention in which a data vlan 710 spans multiple rings interconnected by one node 709. There is an EAPS domain 701, 702 running on each ring 711, 712. Each EAPS domain has a control vlan 703, 705 and a master node 707, 708. The data vlan spans both rings 711, 712 and is added as a protected data vlan 710 in both EAPS domains 701, 702. It will be appreciated by one of ordinary skill in the art that FIG. 6 and FIG. 7 are only two examples of EAPS domains and how they relate to various underlying networks. Other configurations of EAPS domains 101 and ring networks 102 may be employed without departing from the scope of the invention.

Figure 8:
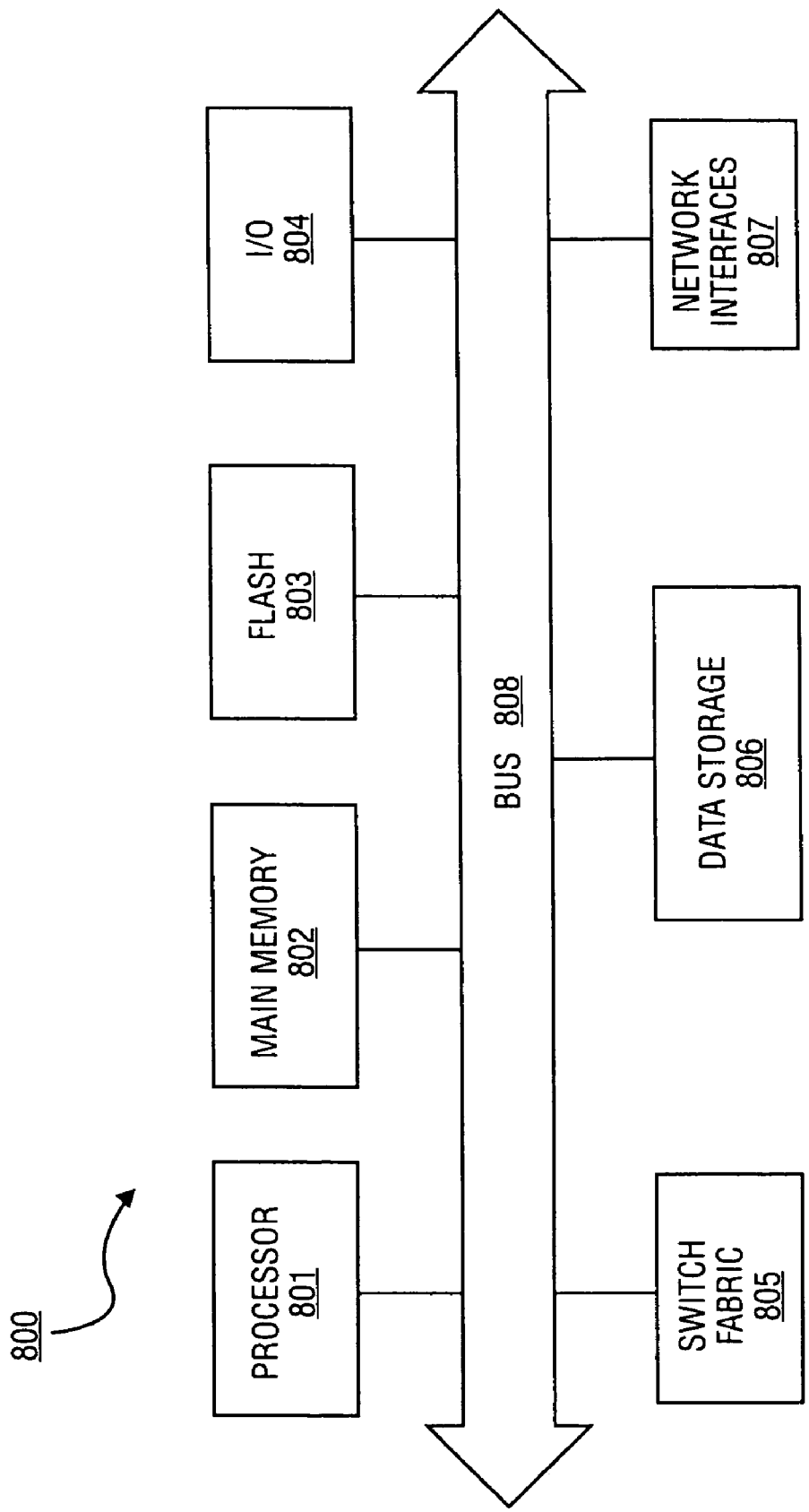
FIG. 8 illustrates one embodiment of a suitable computing environment in which certain aspects of the invention illustrated in FIGS. 1–7 may be practiced.

FIG. 8 illustrates one embodiment of a suitable computing environment in which certain aspects of the invention illustrated in FIGS. 1–7 may be practiced. The master node 105 and the transit nodes 111 of FIG. 1 may be implemented on a computer system 800. Components 801–808 of computer system 800 perform their conventional functions known in the art and provide the means for implementing EAPS system 100. Collectively, these components are intended to represent a broad category of hardware systems, including but not limited to general purpose computer systems and specialized network switches.

Computer system 800 includes processor 801, I/O devices 804, main memory 802 and flash memory 803 coupled to each other via a bus 808. Main memory 802, which can include one or more of system memory (RAM), and non-volatile storage devices (e.g., magnetic or optical disks), stores instructions and data for use by processor 801. Additionally, the network interfaces 807, data storage 806, and switch fabric 805 are coupled to each other via a bus 808. The network interface includes the primary port 106 and the secondary port 107 of the master node 105 as well as the ring ports 112 of the transit nodes 111. Data storage 806 represents the state registers 109, 114 and the forwarding databases 108, 113 as well as other storage areas such as packet buffers, etc., used by the switch fabric 805 for forwarding network packets or messages.

It is to be appreciated that various components of computer system 800 may be rearranged, and that certain implementations of the present invention may not require nor include all of the above components. Furthermore, additional components may be included in system 800, such as additional processors (e.g., a digital signal processor), storage devices, memories, network/communication interfaces, etc.

In the illustrated embodiment of FIG. 8, the method and apparatus for Ethernet automatic protection switching according to the present invention as discussed above may be implemented as a series of software routines run by computer system 800 of FIG. 8. These software routines comprise a plurality or series of instructions to be executed by a processing system in a hardware system, such as processor 801 of FIG. 8. Initially, the series of instructions are stored on a data storage device 806, memory 802 or flash 803. It is to be appreciated that the series of instructions can be stored using any conventional computer-readable or machine-accessible storage medium, such as a diskette, CD-ROM, magnetic tape, DVD, ROM, etc. It is also to be appreciated that the series of instructions need not be stored locally, and could be stored on a propagated data signal received from a remote storage device, such as a server on a network, via a network/communication interface 806. The instructions are copied from the storage device 806, such as mass storage, or from the propagated data signal into a memory 802 and then accessed and executed by processor 801.

In alternate embodiments, the present invention is implemented in discrete hardware or firmware. For example, one or more application specific integrated circuits (ASICs) could be programmed with the above-described functions of the present invention.

Accordingly, a method and apparatus is described in which an Ethernet automatic protection switching system prevents loops in a layer-2 ring network. From the foregoing description, those skilled in the art will recognize that many other variations of the present invention are possible. In particular, while the present invention has been described as being implemented in a metropolitan area network comprising multiple nodes or switches, it should be noted that some of the logic described herein may be distributed in other components of a network or implemented in a network of different scope such as a local area network without departing from the scope of the present invention.

Thus, the present invention is not limited by the details described. Instead, the present invention can be practiced with modifications and alterations within the spirit and scope of the appended claims.

What is claimed is:

1. A method comprising:
   blocking data traffic received on a data virtual network at a master node in a ring network;
   receiving on a control virtual network at the master node an indication of a failure to transmit data traffic on the data virtual network; and
   unblocking data traffic received on the data virtual network at the master node in response to detecting the failure.

2. The method of claim 1, wherein blocking data traffic on the data virtual network at the master node comprises blocking data traffic at a secondary port of the master node.

3. The method of claim 1, wherein receiving an indication of a failure to transmit data traffic comprises receiving an indication from a node coupled to the ring that a fault exists in the ring.

4. The method of claim 1, wherein receiving an indication of a failure to transmit data traffic comprises failing to receive at a secondary port of the master node an indication transmitted by a primary port of the master node via the ring.

* * * * *